(12) United States Patent
Tanaka et al.

(10) Patent No.: US 7,758,363 B2
(45) Date of Patent: Jul. 20, 2010

(54) ROTARY CONNECTOR DEVICE EQUIPPED WITH BUILT-IN STEERING ANGLE SENSOR

(75) Inventors: Hiraku Tanaka, Makinohara (JP); Norihito Suzuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 181 days.

(21) Appl. No.: 11/758,218

(22) Filed: Jun. 5, 2007

(65) Prior Publication Data
US 2008/0000712 A1    Jan. 3, 2008

(30) Foreign Application Priority Data
Jun. 30, 2006    (JP) .............................. 2006-182415

(51) Int. Cl.
*H01R 3/00*    (2006.01)
(52) U.S. Cl. ........................................ 439/164; 439/15
(58) Field of Classification Search .................. 439/164, 439/15
See application file for complete search history.

(56) References Cited

U.S. PATENT DOCUMENTS 5,847,342 A * 12/1998 Uchiyama et al. ........ 200/61.54
7,322,115 B2    1/2008 Besier et al.
2006/0272430 A1 * 12/2006 Araki et al. ............ 73/862.321

FOREIGN PATENT DOCUMENTS

| DE | 19933048 A1 |   | 1/2001 |
| DE | 10213224 A1 |   | 10/2003 |
| JP | 2000 159037 | * | 6/2000 |
| JP | 2000-159037 A |   | 6/2000 |

OTHER PUBLICATIONS

German Office Action dated Jun. 25, 2009.

* cited by examiner

*Primary Examiner*—Javaid Nasri
(74) *Attorney, Agent, or Firm*—Sughrue Mion, PLLC

(57) ABSTRACT

A rotary connector device equipped with a rotary connector and a steering angle sensor for detecting rotational angles of a steering wheel, includes one circuit board, in which the circuit board is used for the rotary connector and the steering angle sensor simultaneously. According to the device, since only one circuit board is provided, the total thickness is reduced as compared with other devices having a plurality of circuit boards in the related art.

1 Claim, 6 Drawing Sheets

ROTARY CONNECTOR DEVICE EQUIPPED WITH BUILT-IN STEERING ANGLE SENSOR

BACKGROUND OF THE INVENTION

1. Field of the Invention

The present invention relates to a rotary connector device equipped with a built-in steering angle sensor in which a steering angle sensor detecting a rotational angle of the steering wheel in a vehicle and a rotary connector used in the steering wheel are integrated, particularly for obtaining a small-sized rotary connector device equipped with a built-in steering angle sensor.

2. Related Art

A steering wheel of a vehicle is provided with a horn and audio control switches etc. Further, a number of vehicles in which a steering wheel equipped with an airbag for absorbing shocks in a crash are being increased. A vehicle is equipped with a rotary connector having a rotary side rotating with the steering wheel and a stationary side not rotating that are connected with a flexible flat cable (FFC), in order to maintain electric connection of parts disposed in the steering wheel with the car body even while the steering wheel rotates.

Further, recently, as vehicles become intelligent, vehicles that allow adjustment of driving control according to operational angles of a steering wheel in traveling have been on the market. Such vehicles are equipped with a steering angle sensor to detect rotational angles of the steering wheel.

JP-A-2000-159037 discloses a rotary connector device equipped with a built-in steering angle sensor manufactured thin by integrating the steering angle sensor and a rotary connector.

FIG. 5 is a schematic view of the above-mentioned device. The device includes a rotary connector 20, an FFC 27, a rotary connector-stationary cover 23 providing a space for the FFC 27, a lower stationary cover 21, a rotary cover 22 rotating with a steering wheel 10, and a circuit board 24. Further, a steering angle sensor 30 includes an annular driving gear 38 rotating with the steering wheel 10, a driven-gear 39 rotating by meshing with the annular driving gear 38, a circuit board 41 equipped with a rotational detecting element for the driven-gear 39, and a lower stationary cover 21 for the rotary connector 20 and a steering angle sensor-lower stationary cover 37 that provide a space for the parts.

The FFC 27 has a large-diameter winding portion 271 that is formed counterclockwise around the outer wall of the rotary connector-stationary cover 23, a small-diameter winding portion 272 that is formed clockwise around the cylindrical portion of the rotary cover 22, and a reverse portion that reverses the winding direction of the large-diameter winding portion 271 and the small-diameter winding portion 272. The end of the large-diameter winding portion 271 is connected to a connector 26 of the rotary connector-stationary cover 23 and the end of the small-diameter winding portion 272 is extended through a through-hole of the rotary connector-stationary cover 23 and connected to a circuit board 24. Further, the end of the small-diameter winding portion 272 is electrically connected to a connector 25 of the rotary cover 22 through the circuit board 24.

As the steering wheel 10 rotates and the rotary cover 22 correspondingly rotates, the small-diameter winding portion 272 of the FFC 27 is rotated together with the rotary cover 22. With the small-diameter winding portion 272 rotating, the large-diameter winding portion 271 of the FFC 27 is fixed with the rotary connector-stationary cover 23. The rotation of the steering wheel 10 is absorbed by movement of the reverse portion and an electric passage formed by the connector 26, FFC 27, circuit board 24, and connector 25 are maintained.

The configuration of the steering angle sensor 30 is shown in detail in FIG. 6. FIG. 6 is an exploded perspective view of each part of the steering angle sensor 30 upside down, seen from below.

In the steering angle sensor 30, as the steering wheel 10 rotates, the annular driving gear 38 rotates, the driven-gears 39, 40 rotate, and magnets fixed to the driven-gears 39, 40 correspondingly rotate. Changes in the magnetic fields due to the rotation of the magnets are detected by the circuit element of the circuit board 41 and rotational angle information of the steering wheel 10 is transferred to the connector 62 of the steering angle sensor-lower stationary cover 37 through the circuit board 41.

To reduce the size and thickness of the rotary connector device equipped with a built-in steering angle sensor, the number of parts is reduced by sharing the lower stationary cover 21 for the rotary connector 20 as the upper housing for the steering angle sensor 30.

It is preferable to reduce the size as much as possible of a rotary connector device equipped with a built-in steering angle sensor attached to a steering wheel to supply flexibility in design around a driver's seat.

However, a rotary connector device equipped with a built-in steering angle sensor in the related art has two circuit boards 24, 41 for a rotary connector and a steering angle sensor, respectively, so that it was difficult to reduce the size and thickness.

SUMMARY OF THE INVENTION

Considering the above problems, it is an object of the invention to provide a small-sized thin rotary connector device equipped with a built-in steering angle sensor.

In order to achieve the above-mentioned object, a rotary connector device equipped with a rotary connector and a steering angle sensor for detecting rotational angles of a steering wheel, includes one circuit board. The circuit board has a first circuit element that transmits rotary angle information of the steering wheel and a second circuit element that transmits control information to operational parts of the steering wheel, and the circuit board is used for both the rotary connector and the steering angle sensor.

According to the rotary connector device equipped with a built-in steering angle sensor having the above configuration, since only one circuit board is provided, it is possible to reduce the size of the device.

Further, the rotary connector device equipped with a built-in steering angle sensor having the above configuration may further include a rotary cover that rotates together with the steering wheel and it is preferable to rotate the circuit board together with the rotary cover.

In additions the rotary connector device equipped with a built-in steering angle sensor having the above configuration may further include a rotary connector body equipped in a combination switch and it is preferable that the circuit board has an output terminal of the steering angle sensor and a connection terminal to the rotary connector body.

According to the invention, it is possible to manufacture a small-sized thin rotary connector device equipped with a built-in steering angle sensor.

The invention was briefly described above. Further, details of the invention will be clear by describing preferred embodiments of the invention hereafter with reference to accompanying drawings.

DETAILED DESCRIPTION OF THE PREFERRED EMBODIMENTS

Preferred embodiments of the invention will be described hereafter with reference to accompanying drawings.

Figure 1:
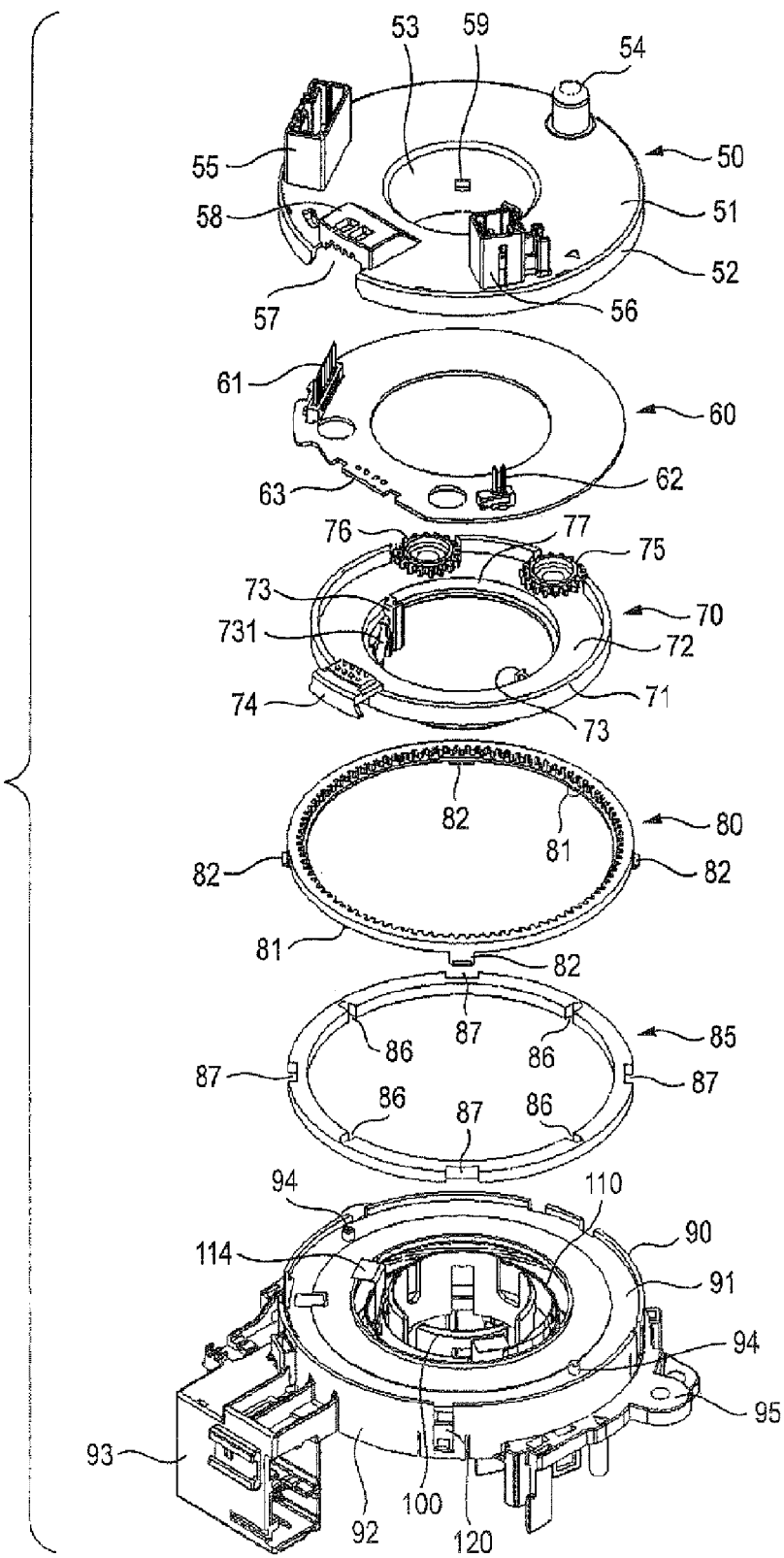
FIG. 1 is an exploded perspective view of a rotary connector device equipped with a steering angle sensor according to an embodiment of the invention.
Figure 2:
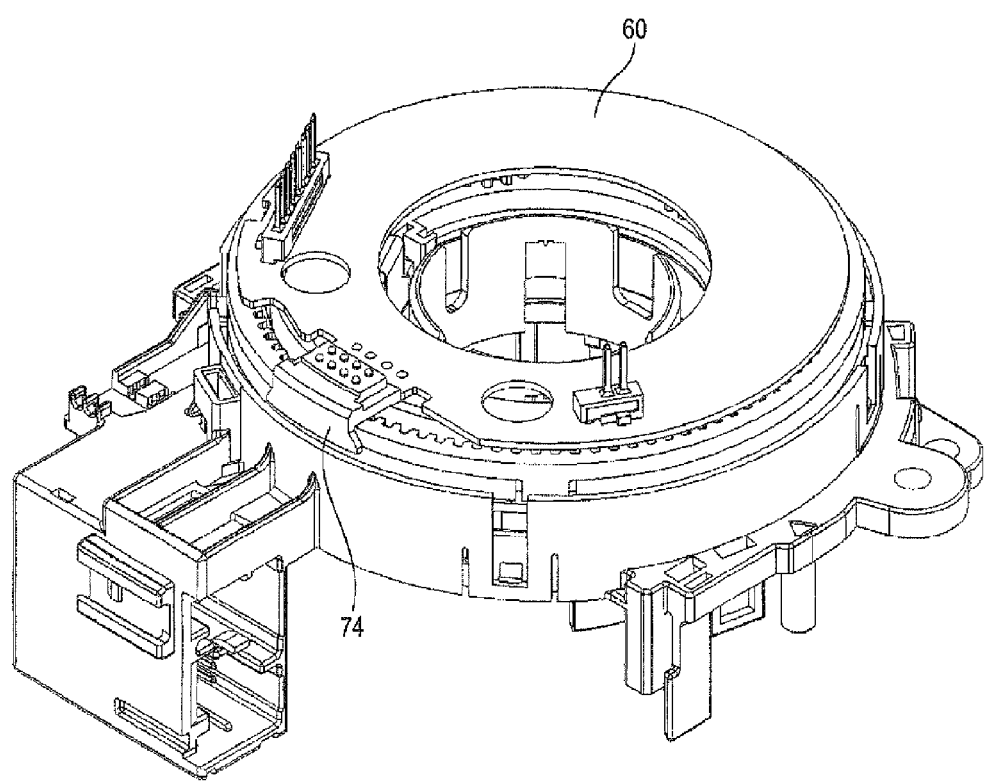
FIG. 2 is a perspective view of the rotary connector device equipped with a steering angle sensor when a rotary cover is removed.
Figure 3:
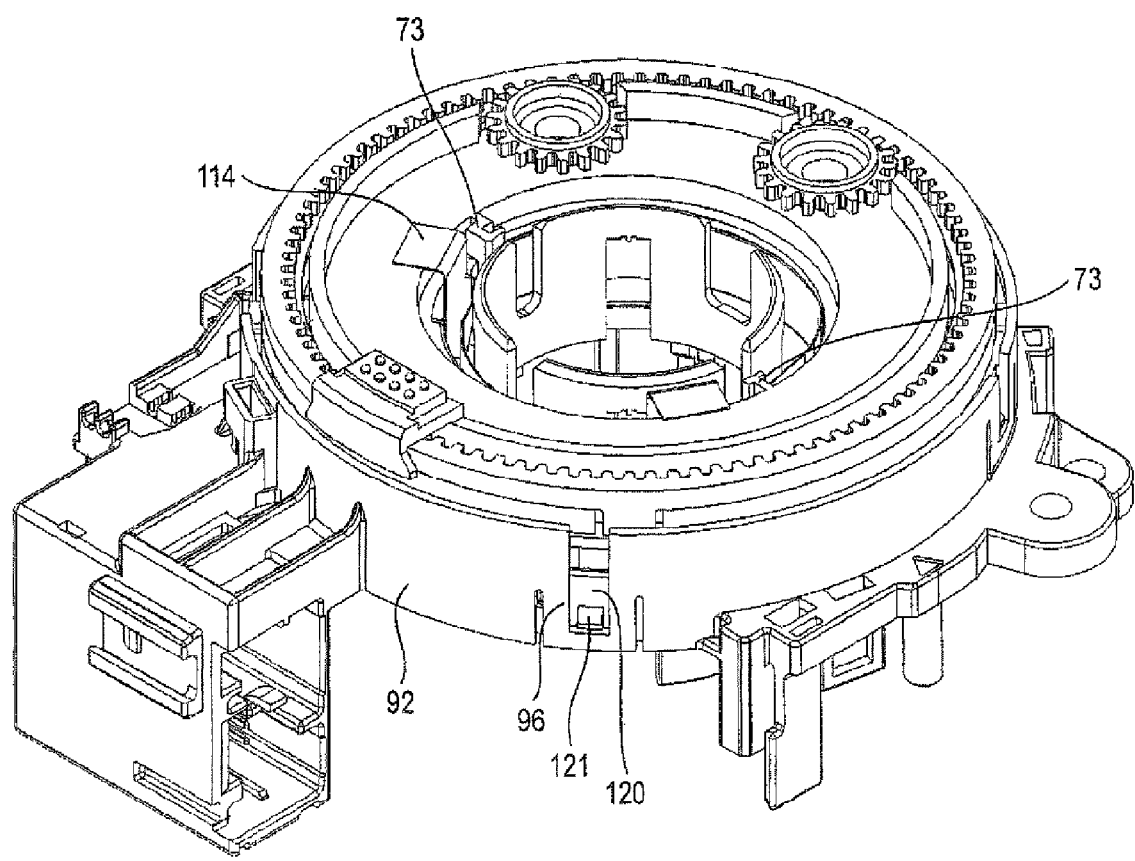
FIG. 3 is a perspective view of the rotary connector device equipped with a steering angle sensor of FIG. 2 when a circuit board is removed.
Figure 4:
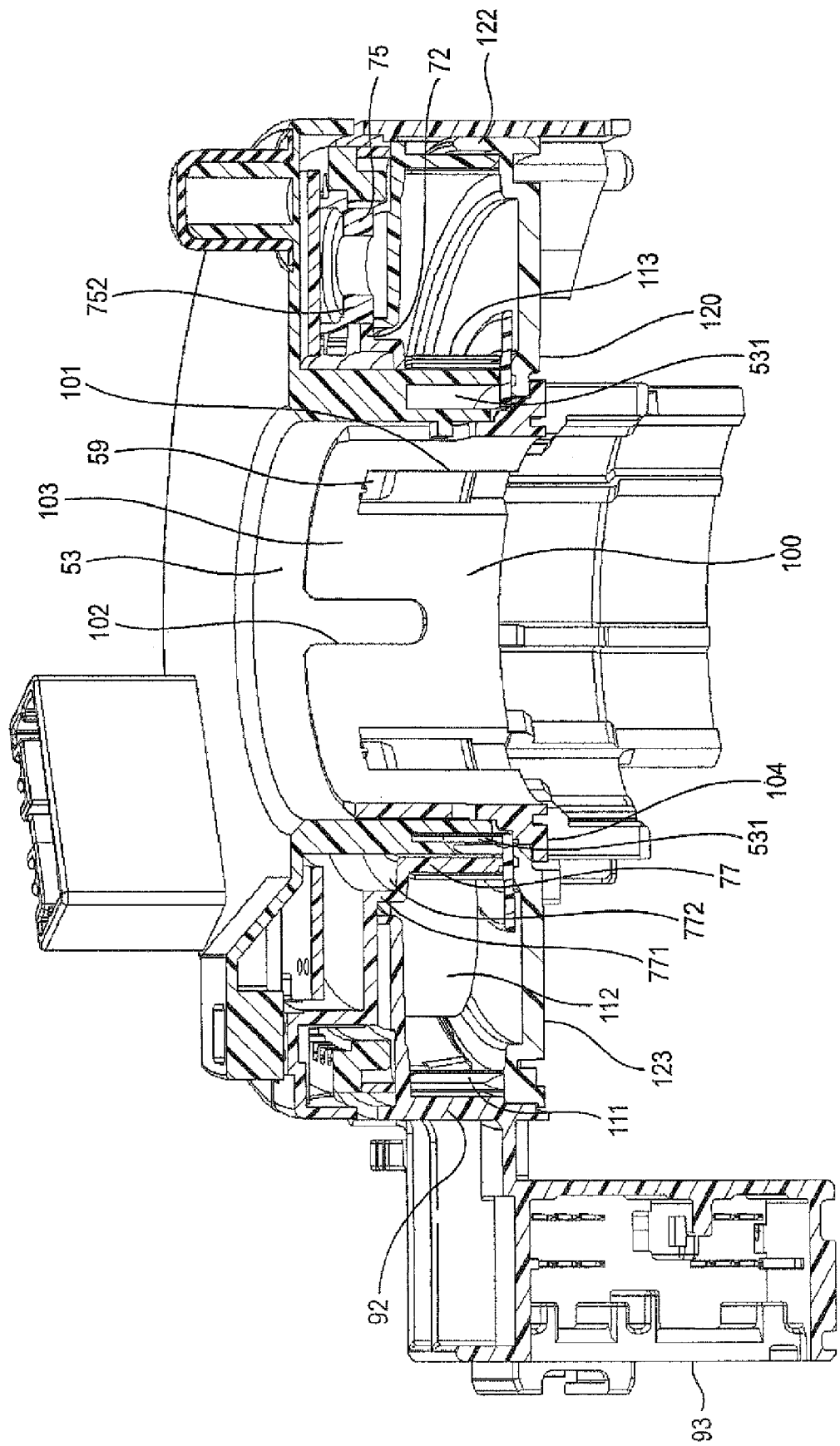
FIG. 4 is a cross-sectional view of the rotary connector device equipped with a steering angle sensor of FIG. 1.
Figure 5:
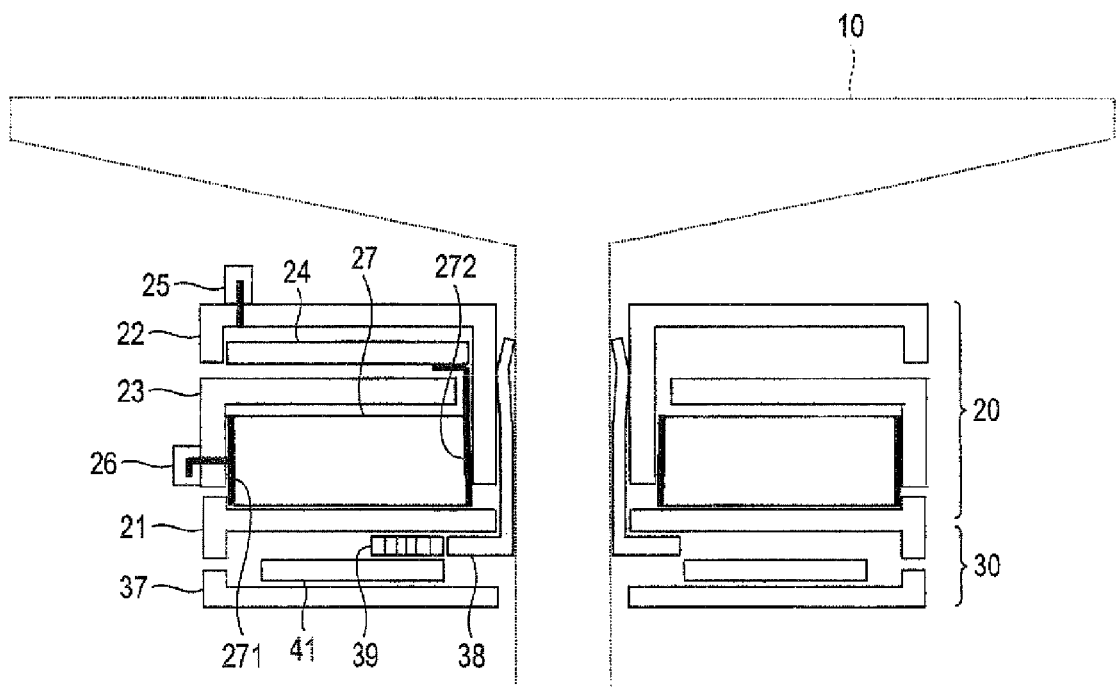
FIG. 5 is a schematic view of a rotary connector device equipped with a steering angle sensor in the related art.
Figure 6:
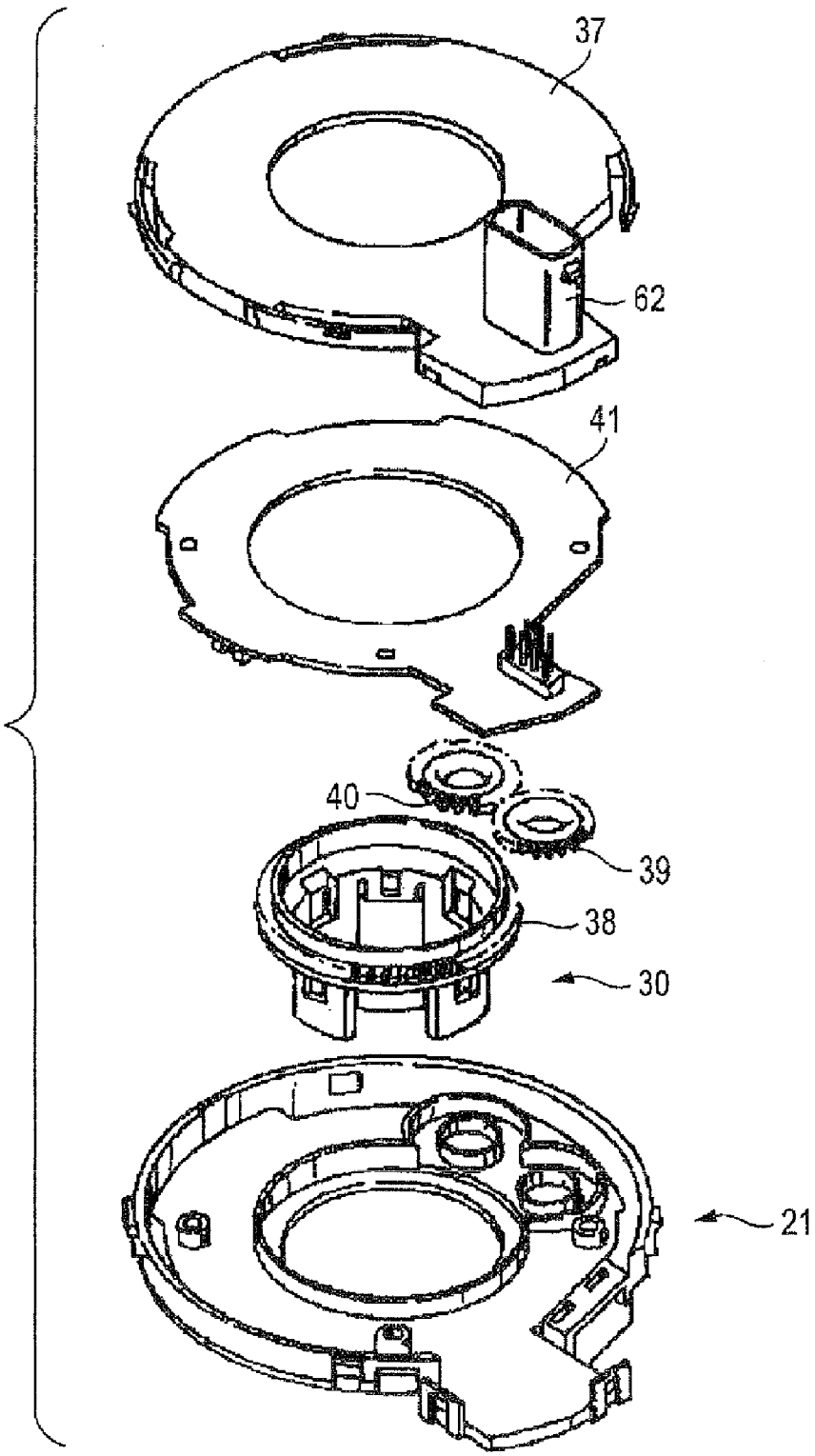
FIG. 6 is an exploded perspective view of a rotary connector device equipped with a steering angle sensor in the related art.

FIG. 1 is an exploded perspective view of a rotary connector device equipped with a steering angle sensor according to an embodiment of the invention, FIG. 2 is a perspective view of the rotary connector device equipped with a steering angle sensor when the rotary cover is removed, FIG. 3 is a perspective view of the rotary connector device equipped with a steering angle sensor of FIG. 2 when the circuit board is further removed, and FIG. 4 is a cross-sectional view of the rotary connector device equipped with a steering angle sensor of FIG. 1.

As shown in FIG. 1, the device includes a rotary cover 50, a circuit board 60, driven-gears 75, 76, a driven-gear holding member 70, an inner-toothed annular stationary gear 80, a coupling ring 85, a rotary connector-stationary cover 90, an FFC 110, a rotary connector-lower cover 120 (FIG. 4), and an attachment member 100 that connects rotary parts and stationary parts.

A steering wheel is positioned above in FIG. 1 and a steering shaft passes through the center holes of the components. Of the components, the rotary cover 50, the circuit board 60, the driven-gear holding member 70, and the attachment member 100 rotate together with the steering wheel.

A rotary connector body is constituted by the rotary connector-stationary cover 90, the FFC 110, and the rotary connector-lower cover 120. In the FFC 110, similar to devices in the related art, a small-diameter winding portion rotates together with the steering wheel and the rotation of the steering wheel is absorbed by movement of a reverse portion formed in a middle of the FFC between the small-diameter winding portion and a large-diameter winding portion.

The rotary cover 50 has a foraminate circular plate 51 with a central cylindrical portion 53 and a short outer wall 52 around the foraminate circular plate 51. Connector housings 55, 56 into which connector terminals 61, 62 formed on the circuit board 60 project, a connecting pin 54 for connecting the rotary cover 50 with the steering wheel, and a cord cover portion 58 having a leading open for cables connected to the circuit board 60 are provided on outer surfaces of the foraminate circular plate 51. Cut portions 57 that are engaged with a locking member 74 of the driven-gear holding member 70 (described later) are formed on the foraminate circular plate 51 and the outer wall 52 around the circuit board 58. Locking protrusions 59 that are engaged with locking grooves 101 (FIG. 4) of the attachment member 100 (described later) are formed on the inner circumference of the cylindrical portion 53. Engagement member (not shown) that are engaged with locking portions 73 of the driven-gear holding member 70 (described later) are formed on the outer circumference of the cylindrical portion 53. Further, the cylindrical portion 53 has gaps 531 to lock the FFC 110 (FIG. 4), which is described later.

The circuit board 60 has the external shape of the foraminate circular plate, received within the outer wall 52 of the rotary cover 50, with a portion cut off straight. The circuit board 60 is located by the straight portion 63 being in contact with the locking member 74 of the driven-gear holding member 70 (FIG. 2). The connector terminals 61, 62 that project into the connector housings 55, 56 are formed on a side of the circuit board 60. The circuit board 60 serves as a rotary connector and a circuit board for the steering angle sensor. The circuit board 60 is provided, on the other side, with a connecting portion (not shown) that is electrically connected with the end 114 of the FFC 110 (described later), a first circuit element (not shown) that detects changes in the magnetic field due to rotation of the driven-gears 75, 76 and generates rotational angle information of the steering wheel, an electric passage (not shown) that connects the connector terminals 61, 62 with cable-leading portion, a second circuit element (not shown) that transmits control information to the operational parts of the steering wheel. One of the connector terminals 61, 62 of the circuit board 60 functions as an output terminal of the first circuit element (not shown) of the steering angle sensor and the other a connecting terminal to the rotary connector body.

The driven-gear holding member 70 has a foraminate circular plate 72, an outer wall 71 surrounding the foraminate circular plate 72, a locking member 74 radially protruding from the top face of the outer wall 71, an inner wall 77 protruding from the inner circumference of the foraminate circular plate 72 in the opposite direction to the outer wall 71, and locking portions 73 fixed around the inner wall 77 and engaged with the outer circumference of the cylindrical portion 53 of the rotary cover 50. The outer wall 71 has a diameter such that it is received in the inner-toothed annular stationary gear 80. Portions of the outer walls 71 where the driven-gears 75, 76 are positioned are cut in order to engage the driven-gears 75, 76 with the inner-toothed annular stationary gear 80. The driven-gears 75, 76, as shown in FIG. 4, each has teeth around the outside, a recess for a magnet at the center, and a cylindrical portion 752 serving as a rotational axis at the center. On the other hand, holes where the cylindrical portions 752 of the driven-gears 75, 76 are fitted are formed in the foraminate circular plate 72 and the cylindrical portions 752 of the driven-gears 75, 76 are rotatably supported in the holes.

The inner wall 77 has a short cylindrical portion 771 (FIG. 4) extending down from the foraminate circular plate 72, a flange 772 (FIG. 4) perpendicular to the end of the short cylindrical portion 771, and an arc portion (FIG. 4) extending down from a portion of the end of the flange. The locking portions 73 are formed axially across the short cylindrical portion 771 and the arc portion of the inner wall 77 and fixed to the short cylindrical portion 771, the flange 772, and the arc portion (FIG. 3). Further, guide portions 731 that guide the end of the FFC 110 drawn out are formed next to the locking portions 73.

The locking member 74 protrudes radially inward and outward from the top face of the outer wall 71 and has an axial step. The portion protruding radially inward has a straight face that contacts with the straight portion 63 of the circuit board 60 (FIG. 2). The axial step is fitted in the cut portion 57 of the rotary cover 50. Further, the portion protruding radially outward is formed such that it fills the removed portion of the outer wall 52 of the rotary cover 50.

Accordingly, when the rotary cover 50 and the driven-gear holding member 70 are assembled with the circuit board 60 therebetween (the engaging member (not shown) of the cylindrical portion 53 of the rotary cover 50 is engaged with the locking portion 73 of the driven-gear holding member 70), the cut portion 57 of the rotary cover 50 is covered by the locking member 74 of the driven-gear holding member 70.

The inner-toothed annular stationary gear 80 is formed in a ring shape that is inserted between the outer wall 52 of the rotary cover 50 and the outer wall 71 of the driven-gear holding member 70 and has teeth around the inside that are engaged with the driven-gears 75, 76. Further, the inner-toothed annular stationary gear 80 has engaging portions 82 that are engaged with the coupling ring 85 at four quadrant positions around the ring. Two protrusions 81 are formed in the symmetrical axis of these four engaging portions 82.

The coupling ring 85 has for notches 87 on the outer circumference where the engaging portions 82 of the inner-toothed annular stationary gear 80 are loosely fitted and four U-shaped grooves 86 where the two protrusions 81 of the inner-toothed annular stationary gear 80 and two protrusions 94 of the rotary connector-stationary cover 90 are fitted. The notches 87 and grooves 86 equally divide the coupling ring 85 into eight parts.

The engaging portions 82 and protrusions 81 of the inner-toothed annular stationary gear 80, the notches 87 and grooves 86 of the coupling ring 85, and the protrusions 94 of the rotary connector-stationary cover 90 are connected by a jointing method of Oldham's coupling. According to the Oldham's coupling, even though two axes are parallel, but not in a line, rotation can be accurately transmitted from one to the other.

The rotary connector-stationary cover 90 has a foraminate circular plate 91, an outer wall 92, a connector housing 93 attached to the outer wall 92, and a fixing portion 95 for fastening the rotary connector body to a combination switch (not shown). Protrusions 94 that are fitted in the grooves 86 of the coupling ring 85 are formed on the foraminate circular plate 91. Further, locking frames 96 (FIG. 3) where locking protrusions 121 (FIG. 3) of the rotary connector-lower cover 120 are formed around the outer wall 92.

The rotary connector-lower cover 120, as shown in FIG. 4, has a foraminate base plate 123 and the outer wall 122 surrounding the foraminate base plate 123. Locking protrusions 121 that are engaged with the locking frames 96 of the rotary connector-stationary cover 90 are formed around the outer wall 122. Further, the foraminate base plate 123 where the FFC 110 are placed does not contact with the FFC 110 by recessing the central ring-shaped portion of the circular base plate in order to reduce contact friction with the movable portion of the FFC 110 (reverse portion 112 which will be described later).

The FFC 110, as shown in FIG. 4, has a large-diameter winding portion 111 that is wound counterclockwise around the inside of the outer wall 92 of the rotary connector-stationary cover 90, a small-diameter winding portion 113 that is wound clockwise around between the arc portion of the inner wall 77 of the driven-gear holding member 70 the cylindrical portion 53 of the rotary cover 50, and a reverse portion 112 that reverses the winding direction between the large-diameter winding portion and the small-diameter winding portion. The large-diameter winding portion 111 is locked to the outer wall 92 to prevent relative deviation from the outer wall 92 of the rotary connector-stationary cover 90. Further, the small-diameter winding portion 113 is locked to the inner wall 77 of the driven-gear holding member 70 and the cylindrical portion 53 of the rotary cover 50 in order to be rotated by the rotary cover 50 and the driven-gear holding member 70. For the locking, the FFC 110 is inserted in the gaps 531 formed at predetermined positions around the cylindrical portion 53 or the gap between the cylindrical portion 53 of the rotary cover 50 and the inner wall 77 of the driven-gear holding member 70.

An end of the FFC 110 connected with the large-diameter winding portion 111 is connected to the terminal provided in the connector housing 93 of the rotary connector-stationary cover 90. The end 114 (FIG. 3) of the FFC 110 connected with the small-diameter winding portion 113 is extended upward from a through-hole of the driven-gear holding member 70 by the guide 731 and connected to the rear side of the circuit board 60.

The attachment member 100, as show in FIG. 4, has an elastic cylindrical portion 103 disposed between the inside of the cylindrical portion 53 of the rotary cover 50 and the steering shaft, and a flange 104 formed at the lower end of the elastic cylindrical portion 103. The elastic cylindrical portion 103 has cut portions 102 to provide elasticity and locking grooves 101 that are engaged with the locking protrusions 59 of the cylindrical portion 53 of the rotary cover 50. Further, the flange 104 has a diameter larger than the foraminate base plate 123 of the rotary connector-lower cover 120.

Accordingly, as shown in FIG. 1, the rotary part assembling the rotary cover 50, the circuit board 60, and the driven-gear holding member 70 in this order is superposed onto the stationary part assembling the inner-toothed annular stationary gear 80, the coupling ring 85, the rotary connector-stationary cover 90, and the rotary connector-lower cover 120 (FIG. 4) in this order. The elastic cylindrical portion 103 of the attachment member 100 is inserted from below into the through-holes of the components such that the flange 104 contacts with the outside of the foraminate base plate 123 of the rotary connector-lower cover 120. Finally, assembly of the rotary part with the fixing part of the device is completed by engaging the locking protrusions 59 of the cylindrical portion 53 of the rotary cover 50 with the locking grooves 101 of the elastic cylindrical portion 103.

According to the rotary connector device equipped with a built-in steering angle sensor, as the steering wheel rotates, the rotary cover 50, the circuit board 60, the driven-gear holding member 70, the small-diameter winding portion 113 of the FFC 110, and the attachment member 100 rotate. Specifically, the rotary cover 50 rotates with the steering wheel and correspondingly the circuit board 60 rotates with the rotary cover 50.

In order to rotate the driven-gear holding member 70, the driven-gears 75, 76 engaged with the inner-toothed annular stationary gear 80 rotate and the magnet fixed to the driven-gears 75, 76 rotate correspondingly. As the magnet rotates, changes in the magnetic field are detected by the circuit element of the circuit board 60 and then rotational angle information of the steering wheel is transmitted to predetermined parts through the connectors 55, 93. Signals from the steering angle sensor are outputted to a system of the car body through the connector 93 of the rotary connector body.

Further, as the small-diameter winding portion 113 of the FFC 110 rotates, the reverse portion 112 of the FFC 110 moves, so that rotation of the steering wheel is absorbed. Accordingly, the electric passage between the connector 93 and the connectors 55, 56 is maintained.

According to the device of this embodiment, it is possible to reduce at least the thickness of the circuit board as compared with other devices having a plurality of circuit boards in the related art because the circuit board 60 is used for the rotary connector and the steering angle sensor as well.

According to the device of this embodiment, it is possible to accurately detect steering angles because the steering angle sensor is disposed closer to the steering wheel than the rotary connector. The reasons are as follows.

Appropriate backlash (margin) should be provided to the rotary connector because rotational torque of the steering wheel is excessively large without having radial backlash. The backlash, however, decreases the accuracy in detecting steering angles. Therefore, when the steering angle sensor connected to the rotary connector is positioned further from the steering wheel than the rotary connector, the accuracy in detecting steering angles is decreased by the backlash provided for the rotary connector. However, according to the device of this embodiment, since the steering angle sensor is close to the steering wheel, it is possible to provide backlash for the rotary connector with the steering angle sensor without backlash. Further, according to the device, since the steering angle sensor and the rotary connector are connected by Oldham's coupling, rotation of the steering angle sensor is accurately transmitted to the rotary connector even if the rotational axis of the rotary connector with backlash is not aligned with the rotational axis of the steering angle sensor without backlash.

Further, according to the device of this embodiment, since the inner-toothed ring gear is used to drive the driven-gears, it is possible to increase the area within the ring and easy to dispose the driven-gears and the driven-gear holding member within the ring. In addition, since the gear radius increases, torque for driving the driven-gears decreases Consequently, it is possible to reduce the thickness of the gears and the device accordingly.

The invention is not limited to the above embodiments and may be appropriately changed and modified. Further, as long as the invention is accomplished, the material, shape, number, and position etc. of the components according to the embodiments may be optionally selected, not limited.

For example, in the above embodiments, the inner-toothed ring gear is used to drive the driven-gears, but an outer-toothed gear may be used as in the related art.

Further, two FFCs are provided to the rotary connector, but one or three FFCs may be provided.

Furthermore, it is possible to assemble the parts in ways other than the above.

What is claimed is:

1. A rotary connector device comprising:
a rotary connector;
a steering angle sensor for detecting a rotational angle of a steering wheel; and
a rotary cover that rotates with the steering wheel;
wherein the rotary connector device rotates with the rotary cover and is provided with only one circuit board that transmits rotary angle information of the steering wheel and additionally transmits control information to an operational part of the steering wheel, whereby the circuit board is used for both the rotary connector and the steering angle sensor; wherein the circuit board rotates together with the rotary cover.

* * * * *